United States Patent [19]

Sullivan

[11] 4,346,149

[45] Aug. 24, 1982

[54] WATER BASED ALUMINUM PAINT

[75] Inventor: James E. Sullivan, Fort Myers, Fla.

[73] Assignee: Gulfko Incorporated, Fort Myers, Fla.

[21] Appl. No.: 151,345

[22] Filed: May 19, 1980

[51] Int. Cl.$^3$ ............................................. C08K 3/08
[52] U.S. Cl. ................................. 428/516; 524/441; 524/449; 427/393.5
[58] Field of Search ........... 260/29.2 E, 22 A, 22 CB, 260/23 P, 29.6 S, 29.6 M, 29.6 MM; 428/516

[56] References Cited

U.S. PATENT DOCUMENTS

| | | | |
|---|---|---|---|
| 2,795,564 | 6/1957 | Conn et al. | 260/29.6 MM |
| 2,904,523 | 9/1959 | Hawkins et al. | 260/29.6 MM |
| 3,025,252 | 3/1962 | Jack | 260/29.6 MM |
| 3,244,542 | 4/1966 | Brown et al. | 260/29.6 MM |
| 3,320,198 | 5/1967 | Hill | 260/29.6 MM |
| 3,325,425 | 6/1967 | Bray | 260/29.6 MM |
| 3,494,882 | 2/1970 | Andrews | 260/22 A |
| 3,839,254 | 10/1974 | Fang | 260/29.6 MM |
| 3,926,874 | 12/1975 | Petty et al. | 260/29.2 E |
| 4,123,401 | 10/1978 | Berghmans et al. | 260/29.6 MM |

OTHER PUBLICATIONS

Singer, Fundamentals of Paint, Varnish and Lacquer Technology, Published by the American Paint Journal Company, St. Louis, MO., 1957, pp. 69, 75, 76, 156, 157, 172 and 173.

*Primary Examiner*—Paul R. Michl
*Attorney, Agent, or Firm*—Alfred E. Wilson; Meredith P. Sharks

[57] ABSTRACT

This invention relates to a water based aluminum paint, particularly for dark colored polyethylene film for outdoor agricultural uses. This paint has high reflectivity towards light, and is water and crack resistant. It contains aluminum paste or powder, mica as an extender, acrylic polymer, and water, together with a small quantity of a dispersant and antifoam. The acrylic polymer may be modified by the addition of minor amounts of alkyd resins, vinylacrylic copolymer, polyesters, and the like.

9 Claims, No Drawings

WATER BASED ALUMINUM PAINT

BACKGROUND OF THE INVENTION

This invention relates to a water based aluminum paint for plastic film, especially for outdoor agricultural uses.

Farm growers often use a polyethylene film around growing plants, especially of the vine type, to conserve the moisture in the soil and to reduce the growth of weeds. The film also holds in the nutrients and acts as a mulch. This practice is generally useful in the tropical and sub-tropical areas because of the intense rays of the sun.

We are concerned primarily with the large growers with an average area of 500 acres of bush or vine-type vegetables and fruits, such as tomatoes, peppers and melons. In the tropical and sub-tropical zones, because of the intense heat of the sun's rays, the farmers, using various plain films and films painted white, learned that it was necessary for the film to have a reflective quality so as to maintain the moisture and nutrients in the soil. Clear polyethylene film is too expensive because it is made from pure pellets of polyethylene which require a higher machine temperature to melt to a viscous liquid form so that it can be properly extruded into films. Black polyethylene, which is made primarily of scrap film, does not require this high heat and thus the film can be prepared at a higher speed and consequently lower cost.

The plain or unpainted film did not solve the farmer's problem as the film allowed the sun's rays to penetrate through the film. However, the black film absorbed the sun's rays. When painted with a white paint, the film had only a small amount of reflectivity and acted primarily as an insulator.

A solvent based aluminum paint was then used, and found to give the desired reflectivity when applied to a black colored polyethylene film. However, in order to reduce the viscosity so that the paint would be suitable for spray painting, mineral spirits from petroleum was added. This was expensive, especially since this solvent contributes no other value. In addition, mineral spirits has an offensive odor and pollutes the atmosphere. Also the equipment must be washed with a solvent which increases the cost, requires more labor and more exposure of the laborer to the solvent.

Owners or growers refuse now to use the solvent based aluminum paint because of the health and fire dangers and the high cost of solvents. Because of the energy situation this cost will continue to increase and become more difficult to obtain.

The paint for the plastic film requires the essential reflective characteristics. Other requirements should also be met. For instance, it is desirable that the painted film have a degree of water resistance. A degree of flexibility of the painted film is important also so that the paint will not rupture or craze and as a result be loosened to the extent that it can be removed by the elements such as rain, and/or wind.

SUMMARY OF THE INVENTION

It has now been discovered that a water based aluminum paint suitable for painting plastic film, especially the black polyethylene film used by growers for agricultural uses, can be formulated by using aluminum powder or paste, preferably with a minor proportion of mica, and an acrylic polymer binder, with or without other resins such as long oil alkyds, water based latex materials, or the like. This paint adheres firmly to the plastic film to give the necessary reflectivity. Most importantly, the paint requires only the addition of water to reduce the viscosity so that it can be sprayed properly. This paint can be washed from spraying equipment with soap and water alone, eliminating the use of an organic solvent which pollutes the atmosphere, has an offensive odor and may be harmful to the health of the laborer. The water based paint of this invention conforms with all known air and water pollution regulations, including Los Angeles Rule 66 and San Francisco's Regulation #3. Since the paint is water based and contains no organic solvents, flash fire hazards are eliminated during storage and application.

The paint formulations of this invention are useful not only for painting plastic materials, as described above, but also for painting other types of surfaces.

The aluminum pigment in these formulations is bonded in such a manner that the paint can be applied to paper so that the water runs freely off the film without bleeding of the aluminum.

The paint can also be applied to previously oil painted surfaces, to rusty galvanized metal, to dirty oil galvanized metal, to cinder blocks or masonry, to asphalt or tar paper, and to tile and plain untreated rough pine wood, and the like. The coverage is excellent as is the bond and water resistance.

DESCRIPTION OF THE PREFERRED EMBODIMENTS

The following formulation represents a preferred embodiment of my invention. This product is a water based aluminum paint which is safe, economical and effective for use in painting plastic film, and especially commercial grades of black polyethylene films.

|  | Parts by Weight |  |
|---|---|---|
| Water | 18.0 | |
| Dispersant | 0.05 | |
| Aluminum Paste | 4.5 | |
| Mica | 1.0 | |
| Acrylic Polymer | 25.0 | |
| Antifoamer | 0.05 | |
| | 48.60 | Total |

To make up this formula the water, dispersant, aluminum paste and mica are added in the above order while stirring at the rate of about 2500 R.P.M. for about 30 minutes. The acrylic polymer and antifoamer are then added to the mixture, and the R.P.M. is reduced to about 1000 R.P.M. for 15 minutes. The paint is then strained to eliminate any lumps that might cause clogging of the nozzles of the sprayer used by the farmers.

Other useful formulations include the following:

|  |  | Parts by Weight |  |
|---|---|---|---|
| (A) | Water | 25.0 | |
|  | Dispersant | 0.075 | |
|  | Aluminum Powder | 5.5 | |
|  | Mica, finely divided | 1.0 | |
|  | Acrylic Polymer | 25.0 | |
|  | Antifoamer | 0.05 | |
|  |  | 56.625 | Total |
| (B) | Water | 18.0 | |
|  | Dispersant | 0.05 | |
|  | Aluminum Paste | 2.75 | |
|  | Mica, finely divided | 2.75 | |

|     |                     | Parts by Weight |       |
| --- | ------------------- | --------------- | ----- |
|     | Acrylic Polymer     | 25.00           |       |
|     | Antifoamer          | 0.05            |       |
|     |                     | 60.60           | Total |
| (C) | Water               | 18.0            |       |
|     | Dispersant          | 0.05            |       |
|     | Aluminum Paste      | 4.5             |       |
|     | Mica, finely divided| 1.0             |       |
|     | Acrylic Polymer     | 25.0            |       |
|     | Antifoamer          | 0.05            |       |
|     | Long Oil Alkyd      | 2.5             |       |
|     |                     | 51.10           | Total |
| (D) | Water               | 25.0            |       |
|     | Dispersant          | 0.075           |       |
|     | Aluminum Powder     | 5.5             |       |
|     | Mica, finely divided| 1.0             |       |
|     | Acrylic Polymer     | 25.0            |       |
|     | Antifoamer          | 0.05            |       |
|     | Long Oil Alkyd      | 2.5             |       |
|     |                     | 59.125          | Total |

In the above formulations the aluminum paste supplied by the manufacturer contains about 80% aluminum, 5% wetting agent and 15% water.

Since dry aluminum powder presents the ever-present danger of explosions under certain conditions, as is well known by paint manufacturers and paper coating plants, aluminum paste is preferred to aluminum powder.

The mica in the above formulations is wet ground muscovite. Mica can be used in amounts ranging from about 1% to about 20% by weight to replace aluminum, without the resulting paint losing the appearance of the aluminum color. Mica has light reflectivity, and its presence also reduces cracking and crazing. It present cost is approximately 60% less than aluminum. Other varieties of natural mica known as biotite, lepidolite, paragonite, etc. can also be used.

The proportions of the aluminum and mica can be varied. For example, if more reflectance is required, an increase in the amount of aluminum paste or powder would be required. The amount of mica used can vary from 1% to about 100% by weight of the aluminum content.

Mica is not a necessary ingredient, but is used primarily to reduce costs. It is an advantage of my invention that when mica is used in the proportions indicated as an extender for the aluminum paste or powder no perceptable loss in reflectivity results, since mica also disperses the effect of the heat on the film. Accordingly, the mica is useful in my formulation for a purpose not heretofore described. Former reported uses of mica as an extender for aluminum were in proportions which would not be satisfactory for my product end use, and in formulations which employed organic solvents.

In Formula (B) above, the 1:1 ratio of aluminum and mica was tried in our laboratory to prepare us for the increasing high cost of aluminum. This was done in anticipation of the possible resistance of farmers to settle for the higher prices of aluminum.

The acrylic polymer in the above formulations is a 100% aqueous emulsion of acrylic polymers sold under the name Rhoplex ®AC-388. Rhoplex resins are sold by Rohm and Haas, Inc. Other such resins can be used, such as Rhoplex AC-507 Rhoplex ®AC61, and the like.

Typical properties of Rhoplex ® are:

| Appearance | white milky liquid |
| --- | --- |
| Solids content, % | 49.5 to 50.5 |
| pH | 9.0 to 10.0 |
| Weight per gallon, lbs. | 8.8 |
| Bulking value of dry solids, gal./lb. | 0.107 |
| Minimum film-formation temperature, °C. | 6° to 10° |
| Tukon hardness (KHN) | 1 |
| Mechanical stability (Waring Blender 5 min.) | OK |
| Calcium ion stability (mixed with = vol. 10% CaCl$_2$) | OK |
| Heat stability (100 hours at 140° F.) | OK |
| Freeze-thaw stability (5 cycles at −15° C.) | OK |

Suitable dispersants include commercial products known as Tamol 731, Triton X100, Defoamer L-475.

Suitable antifoamers include commercial products sold under the trade names Bulab, Colloids 581-B and Foammaster.

The total amount of water in the formulation can vary from about 12# to about 40#. Reductions to the lower levels would cause difficulties in most spraying applications as the viscosity would be too high. In addition, because farmers use different types of sprayers with nozzles having different sizes, it is better to allow the farmer to adjust the paint viscosity to suit his requirements.

Alkyd resins can also be added to the formulations as a modifier, as in formulations (C) and (D). When alkyd resins are included in the formulations, driers are blended with the alkyd resin and allowed to set for about one hour before adding to the rest of the mix. The amount of alkyd used can range from about 1% to 20% of the total polymer on a dry weight basis. Suitable alkyd resins include long oil alkyds such as Aroplaz 1271 sold by the ADM Division of Ashland Oil and Refining Co.

Other modifiers include water based latex materials such as vinylacrylic copolymers, polyvinyl acetate and Chemacoil, which is a polyester made by McWharter Resins from selected refined tall oil fatty acids. Chemacoil can be used alone as a modifier, or in counction with long oil alkyds to give desirable results.

All of the above named modifiers are used in proportions of approximately one part by weight to twenty parts by weight of the acrylic polymer. The combined weight of all polymeric and resinous materials is about 40% to 55% by weight of the mixture.

The weight ratio of the aluminum paste or powder to the mica is from 5:0 up to 5:1, and the combined weight of aluminum paste or powder and mica is 9% to 12% by weight of the mixture.

The water content is about 35% to 50% by weight of the mixture.

While in the foregoing specification, a detailed description of the invention has been set down for the purpose of illustration, many variations in the details hereingiven may be made by those skilled in the art without departing from the spirit and scope of the invention.

I claim:

1. A process for coating a plastic film with a water based aluminum paint which comprises preparing a paint by adding sequentially while stirring to water containing a small amount of a dispersant, aluminum paste or powder, finely divided mica, an acrylic polymer and an antifoamer in suitable amounts to form a paint, and coating the surface of a plastic film with said paint, said coating having high reflectivity toward heat and light, and being water resistant and crack resistant.

2. The process of claim 1 including the step of adding a predried long oil alkyd resin as a last step to the paint mixture.

3. The process of claim 1 wherein the weight ratio of said aluminum paste or powder to the mica is about 5:0 to 5:1.

4. The process of claim 1 wherein the combined weight of aluminum powder or paste and mica is 9% to 12% by weight of the mixture.

5. The process of claim 1 wherein the combined weight of all polymeric and resinous materials is from 40% to 55% by weight of the mixture.

6. The process of claim 1 wherein the water content is from 35% to 50% by weight of the mixture.

7. The process of claim 1 wherein said plastic film is a polyethylene film.

8. The process of claim 7 wherein said plastic film is a dark colored polyethylene film.

9. The process of claim 1 wherein said acrylic polymer has approximately the following properties:

| | |
|---|---|
| Appearance | white milky liquid |
| Solids content, % | 49.5 to 50.5 |
| pH | 9.0 to 10.0 |
| Weight per gallon, lbs. | 8.8 |
| Bulking value of dry solids, gal/lb. | 0.107 |
| Minimum film-formation temperature °C. | 7° to 10° |
| Tukon hardness (KHN) | 1 |
| Mechanical stability (Waring Blender 5 min.) | OK |
| Calcium ion stability (mixed with a vol. 10% $CaCl_2$) | OK |
| Heat stability (100 hours at 140° C.) | OK |
| Freeze-thaw stability (5 cycles @ −15° C.) | OK |

* * * * *